(12) United States Patent
Wang et al.

(10) Patent No.: US 7,716,462 B2
(45) Date of Patent: May 11, 2010

(54) METHOD FOR INITIATING A DISPLAY CHIP

(75) Inventors: Chin-Yu Wang, Taipei (TW);
Hsien-Shan Wang, Taipei (TW);
Yao-Hui Wu, Taipei (TW)

(73) Assignee: Asustek Computer Inc., Taipei (TW)

( * ) Notice: Subject to any disclaimer, the term of this patent is extended or adjusted under 35 U.S.C. 154(b) by 769 days.

(21) Appl. No.: 11/539,264

(22) Filed: Oct. 6, 2006

(65) Prior Publication Data

US 2007/0094488 A1    Apr. 26, 2007

(30) Foreign Application Priority Data

Oct. 17, 2005    (TW) ............................... 94136228 A

(51) Int. Cl.
*G06F 9/24* (2006.01)
*G06F 15/177* (2006.01)

(52) U.S. Cl. ............................... 713/1; 713/2; 713/100; 714/8; 714/100

(58) Field of Classification Search ............ 713/1, 713/2, 100; 714/8, 100
See application file for complete search history.

(56) References Cited

U.S. PATENT DOCUMENTS

| | | | |
|---|---|---|---|
| 5,842,024 A * | 11/1998 | Choye et al. ............... | 717/178 |
| 6,567,911 B1 | 5/2003 | Mahmoud | |
| 6,631,480 B2 * | 10/2003 | Zeigler et al. .............. | 714/20 |
| 6,965,403 B2 * | 11/2005 | Endo ........................ | 348/231.2 |
| 7,100,087 B2 * | 8/2006 | Yang et al. ................ | 714/36 |
| 2003/0126511 A1 * | 7/2003 | Yang et al. ................ | 714/39 |
| 2003/0221093 A1 * | 11/2003 | Touchet ..................... | 713/1 |

FOREIGN PATENT DOCUMENTS

| | | |
|---|---|---|
| CN | 1049731 | 3/1991 |
| CN | 1506813 | 6/2004 |
| JP | 03-160392 | 7/1991 |
| TW | 222325 | 10/2004 |

OTHER PUBLICATIONS

English language translation of abstract of CN 1049731.
English language translation of abstract of CN 1506813.
English language translation of abstract of JP 03-160392.
English language translation of abstract of TW 222325.

* cited by examiner

*Primary Examiner*—Thomas Lee
*Assistant Examiner*—Michael J Brown
(74) *Attorney, Agent, or Firm*—Thomas, Kayden, Horstemeyer & Risley

(57) ABSTRACT

A method and system for initiating a display chip in a computer system is provided, and the initiating system includes a non-volatile memory, an external storage media and a memory unit. A BIOS which is able to initiate the external storage media is stored in the non-volatile memory. First, a backup file is loaded into the memory unit from the initiated external storage media. Then, an initiating program is fetched from the backup file. Finally, the initiating program is executed to initiate a display chip of a computer system.

20 Claims, 3 Drawing Sheets

METHOD FOR INITIATING A DISPLAY CHIP

RELATED APPLICATIONS

The present application is based on, and claims priority from, Taiwan Application Serial No. 94136228, filed Oct. 17, 2005, the disclosure of which is hereby incorporated by reference herein in its entirety.

BACKGROUND OF THE INVENTION

1. Field of Invention

The invention relates to a method for initiating a display chip of a computer system and, in particular, to a method for initiating a display chip while saving the storage space of the BIOS of the computer system.

2. Related Art

Along with the progressing manufacturing technologies of electronic devices, various kinds of computer systems have become popular among the public. Aside from the well-known personal computers (PC), other portable devices with devoted functions, such as MP3 players, digital cameras, mobile phones, and personal digital assistants (PDA), can also be considered as special kinds of computer systems.

There must be multiple input and output units for any kind of computer system for the user to operate and output results generated by it. Among all kinds of output units, the display unit for displaying images and text is the most important one. Therefore, most electronic devices are equipped with display units.

A computer system always has a basic input/output system (BIOS) for controlling various input and output units. When the computer system is turned on, the BIOS initiates the input and output units for the user to use. The display unit is one of those to be initiated by the BIOS. If the display unit does not operate normally, the user will not be able to know the status of the computer system.

Take an ordinary PC for example. FIG. 1 shows a schematic view of the BIOS 100 in a PC. The BIOS 100 can be divided into a system BIOS 102 and a boot BIOS 104. The system BIOS 102 is capable of initiating sufficient the input and output units of the computer system, so that the computer system can perform the necessary functions to boot to operating system. It also includes the initiating program 106a for initiating the display chip. After the display chip is initiated, the display unit of the computer system then can function normally. Therefore, when a normal start-up situation, the entire computer system is initiated by the BIOS 102.

Currently, the system BIOS 102 in the PC can be updated by the user in order to increase the capability of input and output units. However, this greatly increases the risk of the system BIOS 102 being damaged. Therefore, the PC first checks the system BIOS 102 once it is turned on. Whether the system BIOS 102 is damaged or not, the system BIOS 102 is checked by comparing with a check sum 108. If the system BIOS 102 is damaged, the PC should be initiated using the boot BIOS 104.

The existence of the boot BIOS 104 is to allow the user to restore or update the system BIOS 102 when the system BIOS 102 is damaged. Therefore, the user cannot write into that region. Consequently, that region is less likely to be damaged. Since its space requirement is far less than system BIOS 102, it only initiate necessary components for restoring or updating the system BIOS 102 in the PC. It includes programs such as the initiating display chip program 106b (which may be the same as the initiating display chip program 106a in the system BIOS 102) and the initiating optical disk drive program 110.

As the variety of input and output units in the PC increases, more initiating programs (e.g., the USB initiating program) are included in the boot BIOS 104. Therefore, the space of the boot BIOS 104 becomes insufficient. If the initiating display chip program 106b, which occupies a large amount of space in the boot BIOS 104, can be offloaded, the capacity of boot BIOS 104 will increase. In this case, a new method for initiating the display chip is required, so that it can be initiated when the system BIOS 102 is damaged.

SUMMARY OF THE INVENTION

An objective of the invention is to provide a method for initiating a display chip in the computer system.

Another objective of the invention is to provide a method to ensure the normal operation of a display unit when the system BIOS of a computer system is damaged.

A further objective of the invention is to provide a method to save storage space for the boot BIOS of a computer system.

To achieve the above objectives, an embodiment of the disclosed method for initiating a display chip is implemented in a boot BIOS of a computer system. An initiating program for initiating the display chip of the computer system is contained in a backup file, which is stored in an external storage media so that the BIOS has more storage space. When the computer system is turned on, the backup file is first loaded from the external storage media into a memory unit of the computer system. The initiating display chip program in the backup file is then extracted. Finally, the initiating display chip program is executed to initiate the display chip of the computer system, so that the display unit can function normally.

To minimize the size of the backup file for saving storage space and required loading time, the backup file can contain a compressed initiating display chip program and a decompressing program for the initiating display chip program. Therefore, before executing the initiating program to initiating the display chip, a decompressing step is performed to recover the initiating program using the decompressing program.

Other types of computer systems may have a system BIOS and a boot BIOS. Under normal conditions, the system BIOS performs the job of initiating the display chip. The boot BIOS is used to initiate the display chip only when the system BIOS is damaged. Therefore, the computer system first checks whether the system BIOS is damaged when it is turned on. If the system BIOS is damaged, the boot BIOS is used to execute the task of initiating the display chip.

In accordance with the above-mentioned method, an embodiment of the disclosed display chip initiating system includes a non-volatile memory, an external storage media, and a memory unit. The non-volatile memory is used to store the boot BIOS that can initiate the external storage media. The external storage media is used to store a backup file containing an initiating display chip program. The memory unit is used to temporarily store the backup file and the initiating display chip program. At the same time the initiating system is started, the boot BIOS is executed to initiate the external storage media. Afterwards, the backup file in the external storage media is loaded into the memory unit.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Thanks to advancements in manufacturing technology of electronic products, the computer system can be added with more peripheral devices. The number of tasks to be processed by the computer BIOS is also increasing. The BIOS needs to hold more program codes, yet its storage space is limited. To effectively use the storage space of the BIOS, the basic idea of the invention is to move an initiating display chip program that occupies larger BIOS storage space to an external storage media. It then can be loaded into the memory unit of the computer system and executed when needed. Therefore, the extra BIOS storage space can be used to hold other program codes (such as codes for other peripheral devices).

Figure 1:
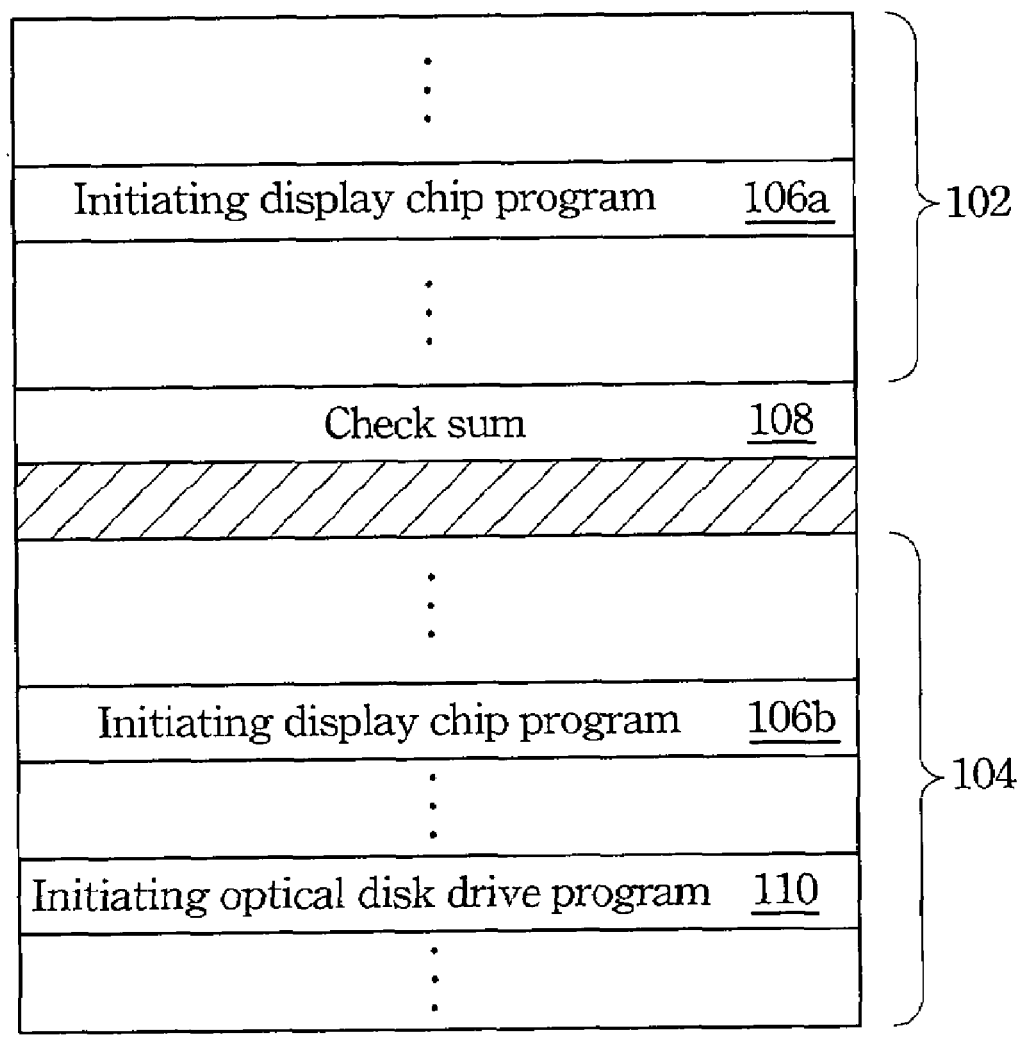
FIG. 1 is a schematic view of the BIOS of a ordinary PC.
Figure 2:
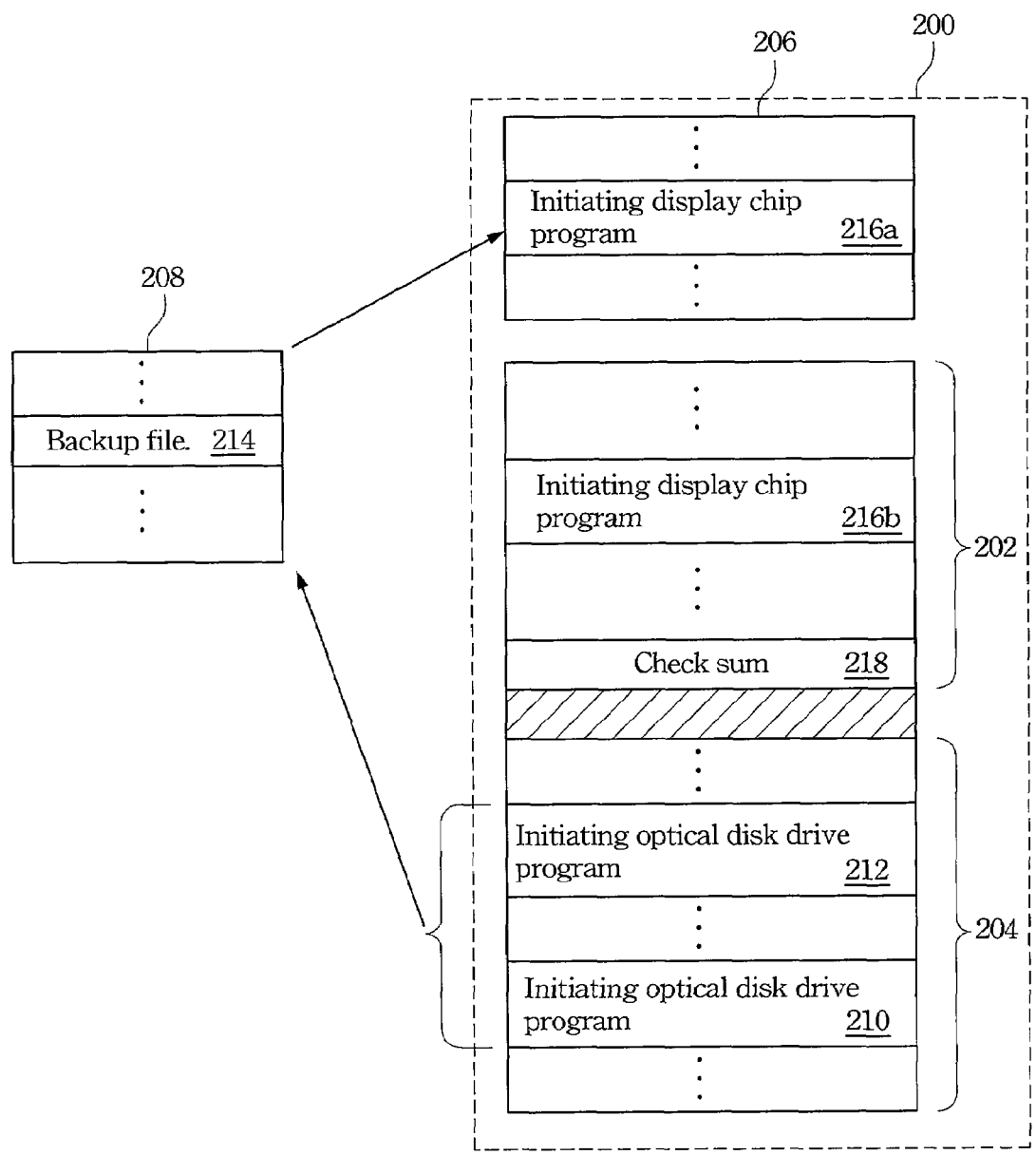
FIG. 2 is a schematic view of actions taken in the disclosed method.

FIG. 2 is a schematic view of actions taken in the disclosed method, wherein a computer system 200 includes a boot BIOS 204 and a memory unit 206 and is connected with an external storage media 208. The boot BIOS 204 is usually stored in a non-volatile memory, such as a flash, EEPROM, EPROM, or MASK ROM. The difference this embodiment and the conventional boot BIOS (such as the boot BIOS 104 in FIG. 1) is that the interior of the boot BIOS 204 does not include the initiating display chip program to initiate the display chip of the computer system 200. Therefore, the boot BIOS 204 can hold more initiating programs for other peripheral devices, such as the initiating optical disk drive programs 210, 212, to increase its capability of controlling peripheral devices.

The initiating program for initiating the display chip of the computer system 200 is packaged in a backup file 214 stored in the external storage media 208. The external storage media 208 in this embodiment can be a non-volatile memory to ensure that the backup file 214 does not disappear after the computer system is turned off. The backup file 214 can be in any file type accessible by the computer system 200, such as an image file. The external storage media 208 is a peripheral storage device that can be initiated by the boot BIOS 204 when the computer system 200 is turned on, such as a disk drive (floppy or hard), tape drive, optical drive, or other storage connected with the computer system 200 using an advanced interface such as SCSI, USB, or IEEE 1394. In other words, the boot BIOS 204 only needs to hold the initiating programs for such peripheral devices or interfaces. Therefore, the files and data in the external storage media 208 can be loaded into memory after the computer system 200 initiating its external storage media 208.

After the boot BIOS 204 initiates the external storage media 208, the display unit of the computer system is still inactive at this moment. That is, the display chip of the display unit is not initiated yet. The backup file 214 is then immediately loaded from the external storage media 208 into the memory unit 206 of the computer system 200. The memory unit 206 can be a system memory of the computer system, such as the random access memory (RAM). The initiating display chip program 216a is extracted from the backup file 214 in the memory unit 206. Finally, the initiating display chip program 216a in the memory unit 206 is executed to initiate the display chip in the computer system 200. The display unit of the computer system 200 is thus initiated for the user to operate the computer system 200.

To reduce the size of the backup file 214 and to increase the speed of loading the backup file 214 into the memory unit 206, the backup file 214 may hold a compressed initiating display chip program 216a and a decompressing program. After the backup file 214 is loaded into the memory unit 206, extract the compressed initiating display chip program 216a and the decompressing program. After the decompression and restoration of the initiating display chip program 216a, it could be used to initiate the display chip of the computer system 200.

Moreover, if the computer system 200 is a PC, it may further contain a system BIOS 202. The storage space inside the system BIOS 202 is larger than the storage space of the boot BIOS 204. Therefore, the system BIOS 202 can store initiating programs for various components in the computer system 200, including the initiating display chip program 216b (which can be the same as the initiating display chip program 216a). In this structure, the system BIOS 202 initiates all functions of the computer system 200 when it is turned on. If the system BIOS 202 is damaged, the boot BIOS 204 takes over the job of initiation to start the functions needed for restoring or updating the system BIOS 202. The user is thus able to restore or update the system BIOS 202. The computer system 200 can determine whether the system BIOS 202 is damaged or not by performing a calculation on the contents of the system BIOS 202 and comparing it with a check sum 218.

Figure 3:
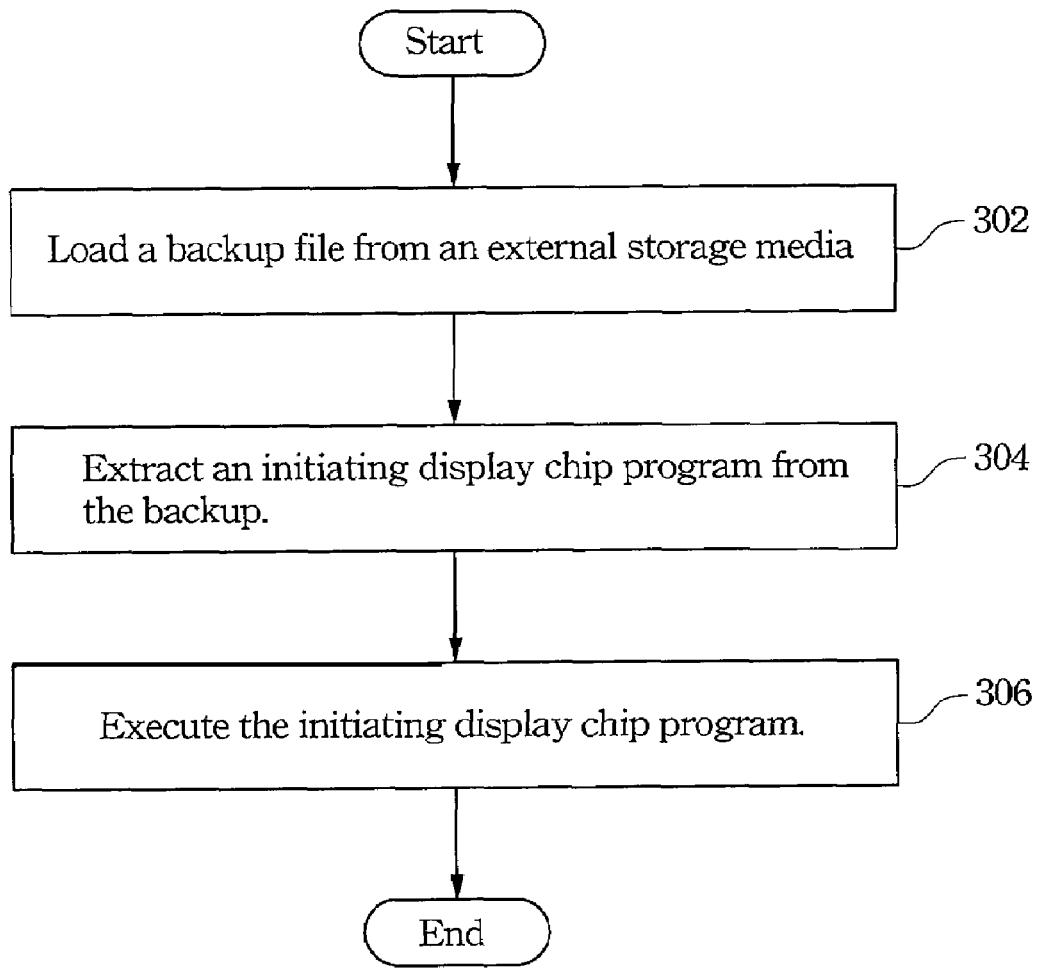
FIG. 3 is a flowchart of the disclosed method.

FIG. 3 summarizes the description above and shows a flowchart of the method according to an embodiment of the invention. In step 302, a backup file is loaded from an external storage media into a memory unit of the computer system. The backup file includes the initiating program for initiating the display chip of the computer system. In step 304, the initiating display chip program is extracted from the backup file. Finally, in step 306, the initiating display chip program is executed to initiate the display chip of the computer system. The user is then able to operate the computer system.

In step 302 described above, the loaded backup file may instead contain a compressed initiating display chip program and a decompressing program. In this case, what are extracted in step 304 are the compressed initiating display chip program and the decompressing program. In step 306, the decompressing program is first executed to decompress and restore the initiating display chip program before initiating the display chip. Moreover, if the method is applied to a computer system with a system BIOS, then the step of checking the system BIOS is performed before step 302. If the system BIOS is damaged, step 302 follows.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An initiating display chip method for a computer system, wherein the computer system comprises a display chip and a boot BIOS, the initiating display chip method comprising:
   initiating an external storage media by the boot BIOS, wherein the boot BIOS does not include an initiating display chip program;
   loading a backup file from the external storage media;
   extracting the initiating display chip program from the backup file; and
   executing the initiating display chip program to initiate the display chip.

2. The method of claim 1, wherein the computer system is a personal computer (PC).

3. The method of claim 2 further comprising the step of checking whether the system BIOS of the computer system is damaged before loading the backup file.

4. The method of claim 3, wherein the step of checking whether the system BIOS is damaged or not is done by performing a calculation on the contents of the system BIOS and comparing the result with a check sum.

5. The method of claim 1, wherein the external storage media is an optical disk drive, a disk drive, or a storage device.

6. The method of claim 1, wherein the backup file is an image file.

7. The method of claim 6, wherein the memory unit is a random access memory (RAM).

8. The method of claim 1, wherein the backup file is loaded into a memory unit of the computer system.

9. An initiating display chip method for a computer system, wherein the computer system comprises a display chip and a boot BIOS, the initiating display chip method comprising:
   initiating an external storage media by the boot BIOS, wherein the boot BIOS does not include an initiating display chin program;
   loading a backup file from the external storage media;
   extracting a compressed file of the initiating display chip program and a decompressing program;
   decompressing the compressed file by the decompressing program into the initiating display chip program; and
   executing the initiating display chip program to initiate the display chip.

10. The method of claim 9 further comprising the step of checking whether the system BIOS of the computer system is damaged before loading the backup file.

11. The method of claim 10, wherein the step of checking whether the system BIOS is damaged or not is done by performing a calculation on the contents of the system BIOS and comparing with a check sum.

12. The method of claim 9, wherein the external storage media is an optical disk drive, a disk drive, or a storage device.

13. The method of claim 9, wherein the backup file is an image file.

14. The method of claim 9, wherein the backup file is loaded into a memory unit of the computer system.

15. An initiating display chip system for a computer system, wherein the computer system comprises a display chip and a boot BIOS, the initiating display chip system comprising:
   a non-volatile memory storing the boot BIOS of the computer system, wherein the boot BIOS does not include an initiating display chip program;
   an external storage media electrically coupled to the non-volatile memory for storing a initiating display chip program of the computer system, wherein the external storage media is initiated by the boot BIOS; and
   a memory unit electrically coupled to the non-volatile memory and the external storage media,
   wherein the initiating display chip program is stored in external storage media then extract to the memory unit to be executed for initiating the display chip when the computer system starts.

16. The system of claim 15, wherein the computer system is a PC.

17. The system of claim 15, wherein the non-volatile memory is a flash memory.

18. The system of claim 15, wherein the external storage media is an optical disk drive, a disk drive, or a storage device.

19. The system of claim 15, wherein the memory unit is a RAM.

20. The system of claim 15, wherein the initiating display chip program in the external storage media is a compressed program.

* * * * *